United States Patent
Bower, III et al.

(10) Patent No.: US 9,874,929 B2
(45) Date of Patent: Jan. 23, 2018

(54) UPDATING FIRMWARE AND CONFIGURATION OF A COMPUTER SYSTEM BY A SYSTEM MANAGEMENT CONTROLLER DURING POWER ON RESET STATE

(71) Applicant: INTERNATIONAL BUSINESS MACHINES CORPORATION, Armonk, NY (US)

(72) Inventors: Fred A. Bower, III, Research Triangle Park, NC (US); Hank C H Chung, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/809,169

(22) Filed: Jul. 25, 2015

(65) Prior Publication Data
US 2016/0026473 A1    Jan. 28, 2016

(30) Foreign Application Priority Data
Jul. 28, 2014   (TW) .............................. 103125670 A

(51) Int. Cl.
G06F 9/00       (2006.01)
G06F 9/24       (2006.01)
(Continued)

(52) U.S. Cl.
CPC .......... G06F 1/3296 (2013.01); G06F 1/3206 (2013.01); G06F 8/65 (2013.01);
(Continued)

(58) Field of Classification Search
CPC ...................................................... G06F 9/4401
(Continued)

(56) References Cited

U.S. PATENT DOCUMENTS 5,473,775 A       12/1995 Sakai et al.
5,504,872 A *     4/1996  Tanaka ................... G06F 12/10
                                                                  711/203

(Continued)

FOREIGN PATENT DOCUMENTS

CN      102446154 A     5/2012
TW      103115435       4/2014
TW      103123654       7/2014

OTHER PUBLICATIONS

Sun Microsystems, Netra CP2160 CompactPCI Board Installation and Technical Reference Manual, 2002, pp. 1-52.*

(Continued)

*Primary Examiner* — Suresh Suryawanshi
(74) *Attorney, Agent, or Firm* — Joseph Petrokaitis; Amy J. Pattillo

(57) ABSTRACT

For system management applied to a computer system, a power supply of the computer system starts to power a motherboard and a CPU thereon. A reset holding module in a system management controller holds the CPU in a Power-on Reset (PoR) state. The system management controller executes an operation requested by a user. The reset holding module releases the CPU from the PoR state in response to the system management controller completing the operation.

13 Claims, 3 Drawing Sheets

(51) Int. Cl.
*G06F 1/00* (2006.01)
*G06F 1/32* (2006.01)
*G06F 9/44* (2006.01)
*G06F 9/445* (2006.01)

(52) U.S. Cl.
CPC .......... *G06F 9/4401* (2013.01); *G06F 9/4403* (2013.01); *Y02B 60/183* (2013.01)

(58) Field of Classification Search
USPC ............................................................ 713/2
See application file for complete search history.

(56) References Cited

U.S. PATENT DOCUMENTS

| | | | |
|---|---|---|---|
| 5,737,612 A * | 4/1998 | Ansel | G06F 1/24 327/143 |
| 6,412,082 B1 | 6/2002 | Matsuura et al. | |
| 6,889,341 B2 * | 5/2005 | Collins | G06F 11/3055 714/22 |
| 7,058,703 B2 * | 6/2006 | Hawkins | G06F 9/4411 709/208 |
| 7,698,544 B2 * | 4/2010 | Lell | G06F 1/24 710/260 |
| 7,965,112 B2 * | 6/2011 | Hou | H03K 17/223 327/142 |
| 8,201,166 B2 | 6/2012 | Garrett et al. | |
| 8,417,774 B2 | 4/2013 | Flynn et al. | |
| 8,819,563 B2 * | 8/2014 | Hass | G06F 3/0622 715/741 |
| 9,367,107 B2 | 6/2016 | Maddigan et al. | |
| 9,424,022 B2 | 8/2016 | Arnold et al. | |
| 2005/0228980 A1 | 10/2005 | Brokish et al. | |
| 2008/0005222 A1 | 1/2008 | Lambert et al. | |
| 2013/0132032 A1 * | 5/2013 | McKeown | G06F 17/00 702/182 |
| 2013/0198349 A1 | 8/2013 | Wright et al. | |
| 2014/0122852 A1 | 5/2014 | Guo et al. | |
| 2016/0054927 A1 | 2/2016 | Chou et al. | |
| 2016/0116967 A1 | 4/2016 | Chung et al. | |

OTHER PUBLICATIONS

U.S. Appl. No. 14/887,553, filed Oct. 20, 2015, In re Bower III, 28 pages.
"List of IBM Patents or Patent Applications Treated as Related", dated Oct. 20, 2015, 2 pages.
U.S. Office Action, dated Nov. 23, 2016, U.S. Appl. No. 14/887,553, filed Oct. 20, 2015, In re Bower III.
USPTO Final Office Action, dated Apr. 27, 2017, U.S. Appl. No. 14/887,553, filing date Oct. 20, 2015, In re Bower III, available via PAIR/IFW, 28 pages.
USPTO Office Action, dated Jul. 18, 2017, U.S. Appl. No. 14/887,553, filing date Oct. 20, 2015, In re Bower III, available via PAIR/IFW, 17 pages.
"Power-On reset and related supervisory functions", Maxim Integrated Products, Jul. 8, 2004, accessed via the Internet at <https://www.maximintegrated.com/en/app-notes/index.mvp/id/3227>, 6 pages.
"IBM Advanced Settings Utility", Jan. 27, 2015, accessed via the Internet at <https://www.ibm.com/support/home/docdisplay?Indocid=tool-asu> as of Jan. 12, 2016, 5 pages.
"Intelligent Platform Management Interface Specification Second Generation", v. 2.0, Intel Hewlett-Packard NEC Dell, Feb. 12, 2004, 590 pages.
USPTO Notice of Allowance, dated Oct. 6, 2017, U.S. Appl. No. 14/887,553, filing date Oct. 20, 2015, In re Bower III, available via PAIR/IFW, 20 pages.

* cited by examiner

UPDATING FIRMWARE AND CONFIGURATION OF A COMPUTER SYSTEM BY A SYSTEM MANAGEMENT CONTROLLER DURING POWER ON RESET STATE

CROSS-REFERENCE TO RELATED APPLICATION

This application claims priority under 35 U.S.C. § 119 from Taiwanese Patent Application No. 103125670, filed Jul. 28, 2014, the entire contents of which are incorporated herein by reference.

BACKGROUND

1. Technical Field

The present invention relates to changing system configuration or updating system firmware in a computer host by a system management controller, and more particularly, to changing the system configuration or updating the system firmware by the system management controller after the user has switched on the power of the computer host, but before booting of the computer host has been completed.

2. Description of the Related Art

When operating a computer system, particularly at the development and testing stages, the user may need to modify configurations of the operating system firmware interface or to update the operating system firmware interface from time to time. Conventionally, the user will try to boot the computer system, and before loading the operating system, switches to configuration tools for the operating system firmware interface to change the configurations. After the changes are done, the user will need to manually reboot the computer system and waste a lot of time in waiting, particularly for large computer systems.

Conventionally, a system management controller is also able to change configurations of the operating system firmware interface or update the operating system firmware interface. The system management controller may be provided with its own user input devices (such as a keyboard and a mouse) and display device for a user to operate the system management controller to perform operations as desired. However, in general, the system management controller rarely needs such user input devices such as a keyboard and a mouse) and the display device. Therefore, the user input devices cause additional costs and waste. Alternatively a conventional system management controller could be controlled remotely, but it will require network support.

BRIEF SUMMARY

The present invention, in an aspect thereof, provides a system management controller in a computer system. In view of a computer system, in general, having its own display device and user input devices (such as a keyboard and a mouse) for a user to operate the computer system, one embodiment of the present invention allows the user to use the computer system's display device, keyboard, and mouse to directly operate the system management controller, so as to update the firmware or configure the system, without the drawbacks of conventional solutions which rely on either an additional display device, keyboard, and mouse exclusively for the system management controller or remote control via networks.

In one embodiment, a system provides a system management controller in a computer system, the computer system comprising a CPU and a power supply for powering the CPU, a bus infrastructure communicatively connecting the CPU and the system management controller, an input/output controller connected to the bus infrastructure, and a user input device connected to the input/output controller for controlling inputs to the CPU. The system provides the system management controller comprising a reset holding module operative, in response to the power supply starting to power the CPU, to hold the CPU in a Power-on Reset (POR) state until the system management controller completes an operation designated by a user, such as update of system firmware or system configurations while the CPU is in the POR state through an input entered via the user input device that is powered and available for inputs to the system management controller while the CPU is in the POR state, the operation designated by the user comprising one or more of a firmware update and a system configuration.

In another embodiment, a system management controller in a computer system is provided. The computer system includes a motherboard, a CPU configured on the motherboard, a power supply for powering at least the CPU, a bus infrastructure communicatively connecting the CPU and the system management controller on the motherboard, an input/output controller connected to the bus infrastructure on the motherboard, and a user input device connected input/output controller for controlling inputs to the CPU. The computer system provides the system management controller comprising a reset holding module operative, in response to the power supply starting to power the CPU, to hold the CPU in a POR state until the system management controller completes an operation designated by a user while the CPU is in the POR state through an input of a user instruction entered via the user input device that is powered and available for inputs to the system management controller while the CPU is in the POR state, the operation designated by the user comprising one or more of a firmware update and a system configuration.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
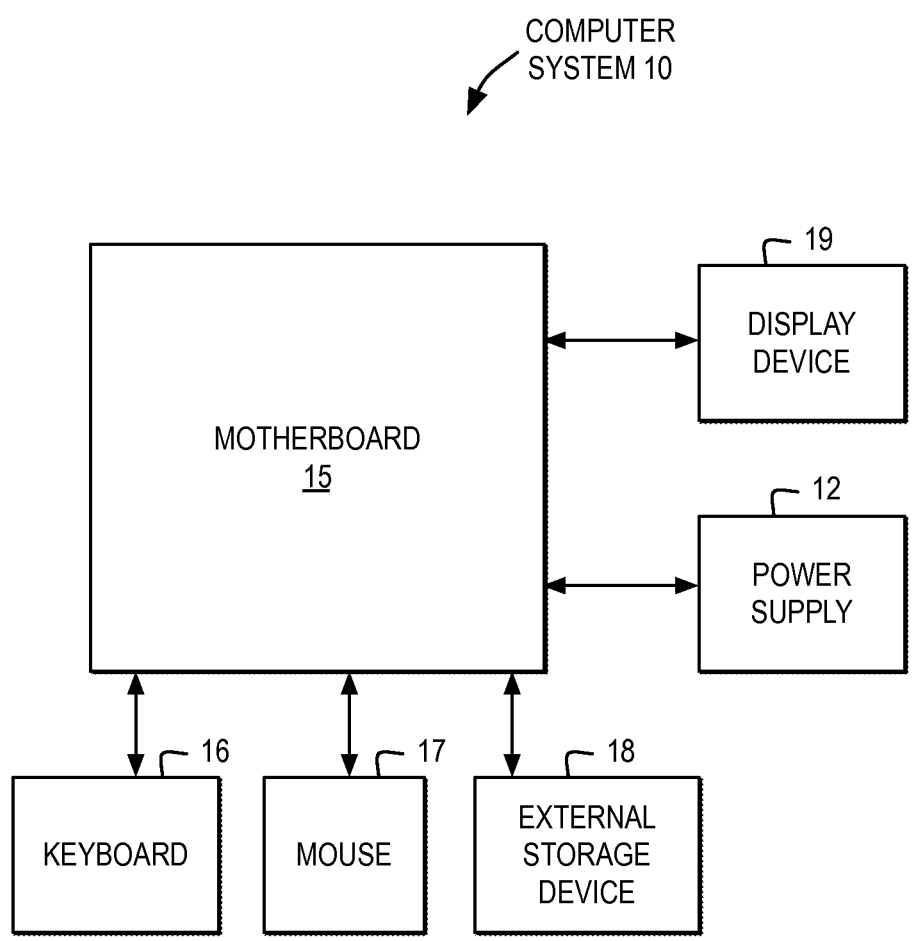
FIG. 1 is a block diagram of a computer system according to an embodiment of the present invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will appreciate that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
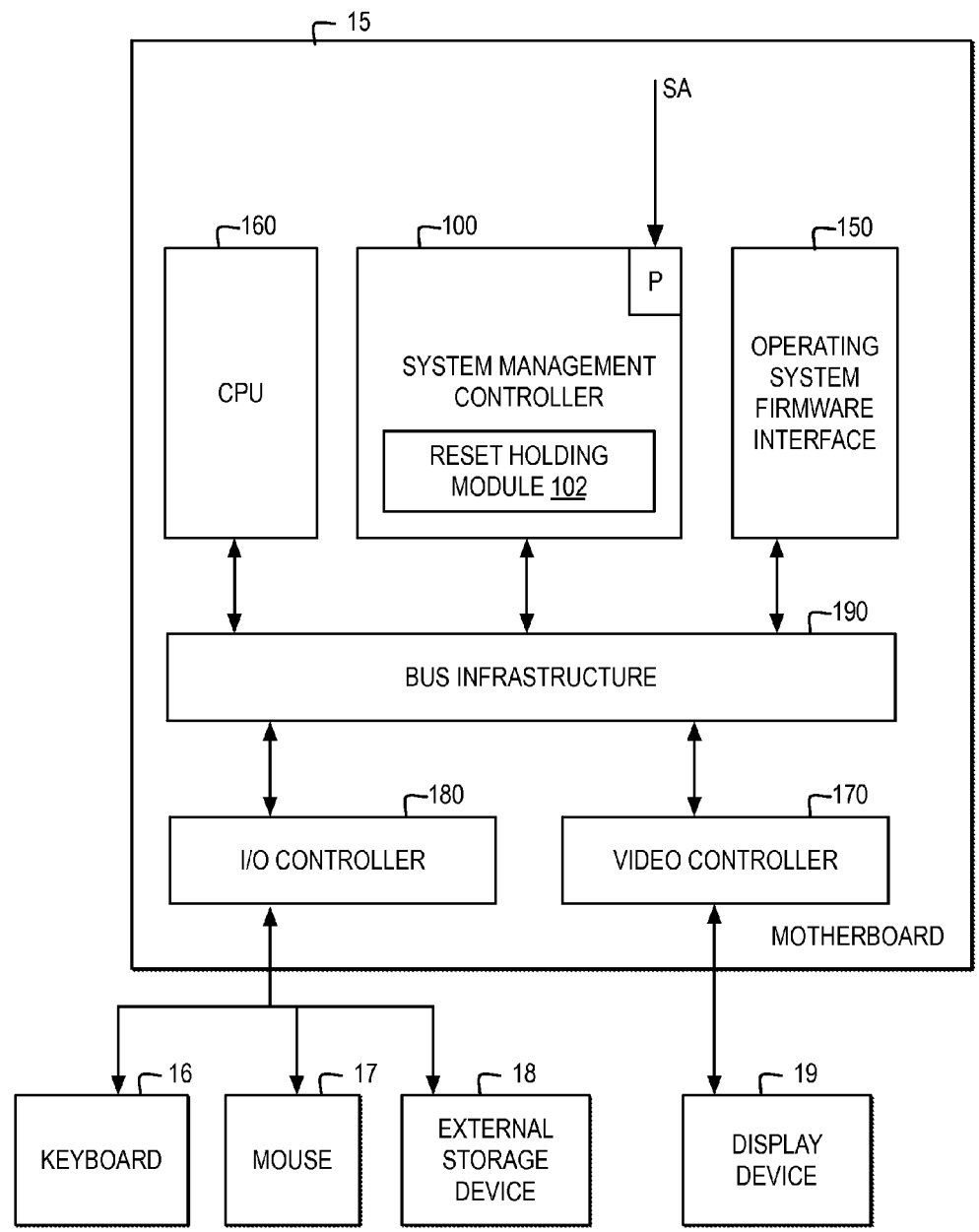
FIG. 2 is a block diagram of a motherboard according to an embodiment of the present invention.
Figure 3:
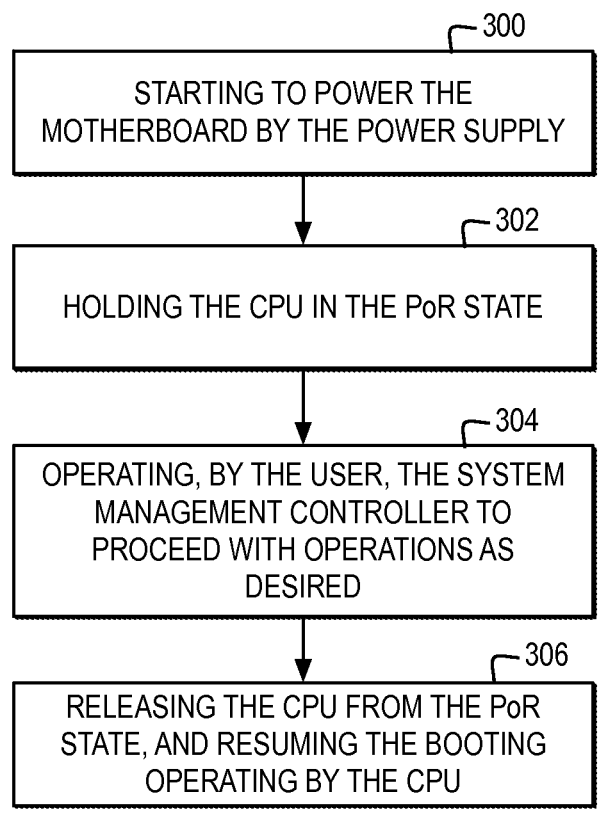
FIG. 3 is a flow chart of a method according to an embodiment of the present invention.

Referring now to FIG. 1, FIG. 2, and FIG. 3, computer systems, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Framework>

FIG. 1 illustrates the hardware framework of a computer system 10 according to an embodiment of the present invention. The computer system 10 includes a power supply 12, a motherboard 15, a keyboard 16, a mouse 17, an external storage device 18, and a display device 19. The keyboard 16, the mouse 17, and the external storage device 18 could be connected to the motherboard 15 via, for example, a USB interface (not shown); the display device 19 could be connected to the motherboard 15 via, for example, a VGA interface or a HDMI interface (both not shown). The power supply 12 is provided to power the motherboard 15 and devices connected to the motherboard 15.

FIG. 2 further shows the motherboard 15 and devices disposed thereon. As shown, the motherboard 15 has a system management controller 100, an operating system firmware interface 150, a CPU 160, a video controller 170, an I/O controller 180, and a bus infrastructure 190. Particularly, the CPU 160 could be communicatively connected to other devices on the motherboard 15 via the bus infrastructure 190.

The bus infrastructure 190 includes, but not limited to, a front side bus (FSB) for the CPU 160, a video bus for the video controller 170, a I/O bus for the I/O controller, a low pin count (LPC) controller for the operating system firmware interface 150, and a PCIe bus for the system management controller 100 (all mentioned buses not shown). Note that, in other embodiments, the motherboard 15 may have more or less devices than as shown in FIG. 2, and the bus infrastructure 190 will be modified accordingly.

The system management controller 100 may be implemented as an IMM (Integrate Management Module), a BMC (Baseboard Management Controller), a node manager, a EC (Embedded controller), or a ME (Management Engine), but the present invention is not limited thereto. One or more examples of system management controller 100, may include, but are not limited to, H8S/2117 of Renesas, EP4CE15F of Altera, or DSPIC30F of Microchip.

In one example, the system management controller 100 includes a reset holding module 102. The reset holding module 102 is a functional module in the system management controller 100 and could be implemented through specific hardware circuit or programming codes stored in the non-volatile memory of the system management controller 100.

Optionally, the system management controller 100 has an I/O port P to receive a user control signal SA generated by the user through a switch or a jumper (both not shown) on the motherboard 15, so as to activate or deactivate the reset holding module 102. More particular details about the reset holding module 102 will be provided later.

The operating system firmware interface 150 could be implemented as, for example, a non-volatile memory chip and has a UEFI (Universal Extensible Firmware Interface), an EFI (Extensible Firmware Interface), or a BIOS (Basic Input/Output System).

On the other hand, the system management controller 100 and the operating system firmware interface 150 can communicate with each other via intelligent platform management interface (IPMI) command, where IPMI defines common communication interfaces.

The system management controller 100 and the operating system firmware interface 150 each has multiple sets of configurations, such as IP address of the system management controller 100 or boot modes of the computer system 10. In one example, the configurations applied to the system management controller 100 and the operating system firmware interface 150, may be performed by IBM's Advanced Settings Utility, which is able to configure remotely the system management controller and the operating system firmware interface.

For the basic framework attributed to the computer system 10 but not directly related to the present invention, computer system 10 may include, but is not limited to, conventional personal computers or servers, such as IBM's System x 3550 M4 and IBM's System x 3650 M4.

While those skilled in the art may have basic understanding about the CPU's PoR state, some explanations are provided. Conventionally when a user presses the power button of a computer system, the power supply will start to power the mother board. Because the supplied power is unstable in the beginning, a control chip set on the motherboard will send a PoR signal to the CPU to hold the CPU in the PoR state, and in response the CPU will restore to its initial status, but the CPU will not execute instructions right away at this moment. When later the chip set detects the supplied power has been stabilized, it will deassert the PoR signal and the CPU will be allowed to execute instructions according to the configurations of the operating system firmware interface and load an operating system.

In one embodiment of the invention, the PoR state of CPU is applied to solve one or more technical problems facing the present invention. In one embodiment, the PoR state of CPU is not only controlled by the conventional chip set according to the supplied power but is also intervened by the reset holding module of the system management controller. With such arrangements, the period that the CPU is held in the PoR state could be controlled as desired. And during this period, because hardware devices (especially the display device and the user input devices) have been powered, they could be used by the system management controller to execute operations desired by the user, such as firmware updates or system configurations. When the system management controller completes the operations, it will release the CPU from the PoR state, and then the CPU will resume the booting operation according to the updated firmware or configurations, without the need of a reboot.

In one example, the system management controller begins the operation after the power supply starts to power the CPU. In another example, the system management controller includes a signal input port for receiving a user control signal to activate or deactivate the reset holding module.

<Process Flow of Method>

The process flow of the method according to an embodiment of the present invention is illustrated with FIG. 3 and described below using the devices illustrated in FIG. 1 and FIG. 2. In one example, one embodiment explained with FIG. 3 may be directed to configuring the operating system firmware interface 150 by the system management controller 100 or to updating the operating system firmware interface 150 by the system management controller 100, while those skilled in the art, when guided by the following explanations, will appreciate that one example of the present invention may be extended to other applications related to the operating system firmware interface 150.

In one example, step 300 illustrates that when the user presses the power button (not shown) of the computer system 10, the power supply 12 (shown in FIG. 1) starts to power the CPU 160 and other devices on the motherboard 15 as shown in FIG. 2. Those skilled in the art will appreciate that, in general, there is an independent power supply circuit (not shown) for the system management controller 100, so that the system management controller 100 is able to operate properly (such as communicating over networks) even when the computer system 10 is shut down or when the CPU 160 has not been powered.

In one example, the system management controller 100 is aware through, for example, IPMI that the motherboard 15 and the CPU 160 have been powered. In one example, step 302 illustrates that the reset holding module 102 of the system management controller 100 communicates with the CPU 160 and holds the CPU 160 in a PoR state.

In an embodiment, the CPU 160 could be first held in the PoR state by a conventional control chipset (such as the north bridge and the south bridge, not shown) on the motherboard 15 according to the power level status of the power supply 12. In one embodiment, distinguished from the prior art, the CPU 160 must wait for a signal from the reset holding module 102 to be released from the PoR state in the embodiment. In other words, conventional control chipset does not effect the release of CPU 160 from the PoR state.

For example, a conventional control chipset may first hold the CPU 160 in the PoR state by pulling a square wave signal from logic low to logic high. In general, the CPU has a specific pin (known as the reset pin, not shown) to receive the square wave signal. When the conventional control chipset is going to release the CPU 160 from the PoR state (generally with assistance of a timer circuit, not shown), it will pull the square wave signal provided to the reset pin from logic high to logic low. By contrast, in the present embodiment, the reset holding module 102 could be communicatively coupled to the reset pin of the CPU 160 and is able to maintain the input of the reset pin as the logic high (i.e., preventing from being logic low), so as to keep holding the CPU 160 in the PoR state even when the conventional control chipset has already output the logic low to the reset pin.

In another embodiment, the conventional control chipset could be replaced by the reset holding module 102 to be connected to the reset pin of the CPU 160, so that the reset holding module 102 is able to fully control the PoR state signals for the CPU 160. Alternatively, the conventional control chipset could be integrated into the reset holding module 102.

In one example, step 304 illustrates, since the CPU 160 and other devices on the motherboard 15 (as shown in FIG. 2) have been powered (as illustrated in step 300), they can communicate data with each other via the bus infrastructure 190 during the period when the CPU 160 is held in the PoR state. In one example, the system management controller 100 can communicate with the video controller 170 and the I/O controller 180. As a result, a visual user interface provided by the system management controller 100 could be output to the display device 19 (as shown in FIG. 1) via the bus infrastructure 190 and the video controller 170 and presented to the user. On the other hand, the user can use the keyboard 16 and the mouse 17 (as shown in FIG. 1) to operate the system management controller 100 through the I/O controller 180 and the bus infrastructure 190.

In an embodiment, at step 304, the user issues commands to the system management controller 100, so as to change configurations of the operating system firmware interface 150, where the display device 19 presents the visual user interface for the user to configure the operating system firmware interface 150, and the user can use the keyboard 16 and the mouse 17 to input configuration values as desired. Preferably, the system management controller 100 will first save contents (e.g., configuration values) of the user's input commands in its own non-volatile memory (not shown). After the user enters a final confirmation (such as by entering a click at the confirmation button in the user interface), the system management controller 100 applies the configuration changes to the operating system firmware interface 150 altogether according to the saved commands.

In one example, configurations applied the operating system firmware interface 150 may be described with reference to IBM's Advanced Settings Utility (ASU). However, note that ASU may be designed to configure remotely the system the operating system firmware interface. By requiring network supports, the conventional ASU approach is totally different from the present invention, which is able to use the keyboard 16, the mouse 17, and the display device 19 locally owned by the computer system 10.

In another embodiment, the user can connect the external storage device 18 (e.g., a removable USB dongle disk) to the I/O controller 180, so that the system management controller 100 can access files or data stored in the external storage device 18 through the bus infrastructure 190. For example, the external storage device 18 can store firmware updating files of the operating system firmware interface 150, and in step 304, the system management controller 100 can access the external storage device 18 and obtain the firmware updating files and then update the operating system firmware interface 150 accordingly. In one example, the updating operation is fully automated. The user simply plugs the external storage device 18 into the computer system 10; the system management controller 100 detects the corresponding firmware updating files and automatically updating the operating system firmware interface 150, without further interventions by the user. As a result, the keyboard 16, the mouse 17, and the display device 19 are not necessary in one example of step 304.

In addition to the updates to the operating system firmware interface 150, the system management controller 100 may perform any other operations requiring external files or data in aforementioned manners, and the present invention is not limited the updates to the operating system firmware interface 150. For example, a system administrator can remotely issue commands to the system management controller 100 to modify or update the operating system firmware interface 150 (for example, to turn on a value-added function) before the power up of the computer system 100 as described with reference step 300. Due to security concerns, the user in the field may be requested to provide authorization data (such as a golden key) through the external storage device 18, so as to authorize the system management controller 100 to proceed with the operation.

In one embodiment, at step 306, when the system management controller 100 completes the operation illustrated in step 304, as desired by the user, the reset holding module 102 can release the CPU 160 from the PoR state. Then, the CPU 160 can resume the booting according to the modified configuration of the operating system firmware interface 150 or the update of the operating system firmware interface 150, without the need of a reboot.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system, comprising:
   a system management controller in a computer system, the computer system comprising a central processing unit (CPU), a power supply for powering the CPU, a bus infrastructure communicatively connecting the CPU and the system management controller, an input/output controller connected to the bus infrastructure, and a user input device connected to the input/output controller for controlling inputs to the CPU; and
   the system management controller comprising a reset holding module operative, in response to the power supply starting to power the CPU, to hold the CPU in a Power-on Reset (POR) state until the system management controller completes an operation designated by a user while the CPU is in the POR state through an input entered via the user input device that is powered and available for inputs to the system management controller while the CPU is in the POR state, the operation designated by the user comprising one or more of a firmware update and a system configuration.

2. The system of claim 1, further comprising the system management controller operative to begin the operation after the power supply starts to power the CPU.

3. The system of claim 1, further comprising a signal input port of the system management controller operative to receive a user control signal generated by the user through a switch to activate or deactivate the reset holding module to hold or release the CPU in the POR state, a second input to the signal input port from the user control signal to the system management controller independent of the bus infrastructure, the switch independent of a button pressed by a user to start the power supply.

4. The system of claim 1, further comprising an operating system firmware interface which communicates with the system management controller, wherein the system management controller and the operating system firmware interface are remotely configurable.

5. The system of claim 1, further comprising a control chip set operative, in response to the power supply starting to power the CPU, to send a POR signal of a square wave signal from logic low to logic high to a reset pin of the CPU to hold the CPU in the POR state until the control chip set detects that the power supply is stabilized and the control chip will pull the square wave signal provided to the reset pin from logic high to logic low, wherein the reset holding module intervenes at the reset pin to hold the CPU in the POR state by maintaining the input of the reset pin as the logic high until the system management controller completes the operation designated by the user, wherein during a period of time when the reset pin of the CPU is in the POR state as set by one or more of the control chip set and the reset holding module, one or more hardware devices also receive the power supply and use the system management controller to execute the operation designated by the user.

6. The system of claim 1, wherein the system management controller presents an interface for the user to configure an operating system firmware interface through a display device communicatively connected to the bus infrastructure, the operating system firmware interface communicatively connected to the system management controller via the bus infrastructure, the user designating the operation through the input entered via the user input device;
   the system management controller, in response to the user designating the operation through the input, operative to save the operation from the input in a non-volatile memory specified for the system management controller; and
   the system management controller, in response to the user entering a confirmation input through the user input device, operative to apply the saved operation from the non-volatile memory to the operating system firmware interface via the bus infrastructure.

7. The system of claim 1, further comprising the reset holding module operative, in response to the system management controller completing the operation, to release the CPU from the POR state, wherein the CPU resumes a booting operation according to a configuration of an operating system firmware interface specified the performed operation and loads an operating system.

8. A computer system, comprising
   a motherboard;
   a central processing unit (CPU) configured on the motherboard;
   a power supply powering at least the CPU;
   a system management controller disposed on the motherboard; and
   a bus infrastructure communicatively connecting the CPU and the system management controller on the motherboard;
   an input/output controller connected to the bus infrastructure on the motherboard;
   a user input device connected to the input/output controller for controlling inputs to the CPU;
   the system management controller comprising a reset holding module operative, in response to the power supply starting to power the CPU, to hold the CPU in a Power-On Reset (POR) state until the system management controller completes an operation designated by a user while the CPU is in the POR state through an input of a user instruction entered via the user input device that is powered and available for inputs to the system management controller while the CPU is in the POR state, the operation designated by the user comprising one or more of a firmware update and a system configuration.

9. The computer system of claim 8, wherein the operation further comprises configuring an operating system firmware interface of the computer system by the system management controller according to the user instruction.

10. The computer system of claim 8, further comprising:
a storage device connected to the bus infrastructure, wherein the storage device is further connected to the system management controller, wherein the operation is based on data stored in the storage device.

11. The computer system of claim 10, wherein the operation further comprises updating an operating system firmware interface of the computer system by the system management controller according to the stored data.

12. The computer system of claim 8, further comprising:
a display device connected to the bus infrastructure, wherein the display device is further connected to the system management controller;
the display device operative to visually present display data regarding the operation to the user;
the system management controller operative to present an interface for the user to configure an operating system firmware interface through the display device communicatively connected to the bus infrastructure;
an operating system firmware interface communicatively connected to the system management controller via the bus infrastructure;
the system management controller, in response to the user designating the operation through the input of the user instruction, operative to save the operation from the user instruction in a non-volatile memory specified for the system management controller; and
the system management controller, in response to the user entering a confirmation input through the input device, operative to apply the saved operation from the non-volatile memory to the operating system firmware interface via the bus infrastructure.

13. The computer of claim 8, further comprising:
a control chip set operative, in response to the power supply starting to power the CPU, to send a POR signal of a square wave signal from logic low to logic high to a reset pin of the CPU to hold the CPU in the POR state until the control chip set detects that the power supply is stabilized and the control chip will pull the square wave signal provided to the reset pin from logic high to logic low, wherein the reset holding module intervenes at the reset pin to hold the CPU in the POR state by maintaining the input of the reset pin as the logic high until the system management controller completes the operation designated by the user; and
one or more hardware devices receiving power from the power supply, wherein during a period of time when the reset pin of the CPU is in the POR state as set by one or more of the control chip set and the reset holding module, one or more hardware devices also receive the power supply and use the system management controller to execute the operation designated by the user.

* * * * *